(12) United States Patent
Pitt et al.

(10) Patent No.: US 7,005,060 B2
(45) Date of Patent: Feb. 28, 2006

(54) UPFLOW SURFACE WATER RUNOFF FILTRATION SYSTEM

(75) Inventors: Robert E. Pitt, Birmingham, AL (US); David A. Woelkers, Brighton, MI (US); Jeffrey K. Suhr, Mukilteo, WA (US)

(73) Assignee: StormTrain LLC, Ann Arbor, MI (US)

( * ) Notice: Subject to any disclaimer, the term of this patent is extended or adjusted under 35 U.S.C. 154(b) by 0 days.

(21) Appl. No.: 10/458,416

(22) Filed: Jun. 10, 2003

(65) Prior Publication Data
US 2004/0251185 A1    Dec. 16, 2004

(51) Int. Cl.
E03F 5/06    (2006.01)

(52) U.S. Cl. .............. 210/163; 210/164; 210/165; 210/170; 210/254; 210/284; 210/311; 404/4

(58) Field of Classification Search ............... 210/163, 210/164, 165, 170, 254, 283, 284, 311; 404/4, 404/5
See application file for complete search history.

(56) References Cited

U.S. PATENT DOCUMENTS

| | | | | |
|---|---|---|---|---|
| 342,151 | A | * | 5/1886 | Walls ............... 210/311 |
| 627,729 | A | * | 6/1899 | Gudeman ............ 210/311 |
| 809,201 | A | * | 1/1906 | Lutz ................... 404/4 |
| 838,129 | A | * | 12/1906 | Mikolasek ........... 210/311 |
| 4,261,823 | A | * | 4/1981 | Gallagher et al. ..... 210/164 |
| 5,707,527 | A | | 1/1998 | Knutson et al. |
| 5,820,762 | A | | 10/1998 | Bamer et al. |
| 6,080,307 | A | | 6/2000 | Morris et al. |
| 6,083,402 | A | | 7/2000 | Butler |
| 6,086,756 | A | | 7/2000 | Roy |
| 6,120,684 | A | | 9/2000 | Kistner et al. |
| 6,217,757 | B1 | * | 4/2001 | Fleischmann ........ 210/163 |
| 6,231,758 | B1 | | 5/2001 | Morris et al. |
| 6,277,274 | B1 | | 8/2001 | Coffman |
| 6,337,025 | B1 | * | 1/2002 | Clemenson ......... 210/170 |
| 6,350,374 | B1 | | 2/2002 | Stever et al. |
| 6,406,218 | B1 | * | 6/2002 | Olson ..................... 404/4 |
| 2003/0089652 | A1 | * | 5/2003 | Matsui et al. ......... 210/163 |

FOREIGN PATENT DOCUMENTS

WO    WO 01/89998    * 11/2001

OTHER PUBLICATIONS

Olson, Norman L., "Water Quality Treatment Device for Stormwater," Mar. 6, 2003, 29 pp, I.S.C. Environmental, Inc.

* cited by examiner

*Primary Examiner*—Christopher Upton
(74) *Attorney, Agent, or Firm*—Miller, Canfield, Paddock and Stone; Robert K. Roth

(57) ABSTRACT

A surface water runoff filtration device comprises an intake which is adapted to receive storm water and other surface water runoff. The surface water runoff flows from the surface through the intake to a point below the filter media, and then up toward the surface through the filter media. This device may be used in both catch basin storm drains and inline drains.

21 Claims, 4 Drawing Sheets

UPFLOW SURFACE WATER RUNOFF FILTRATION SYSTEM

FIELD OF THE INVENTION

This invention relates to improvements to storm water and other surface runoff treatment systems, and more particularly to improved filtration systems for surface runoff into storm drains and inline drains.

BACKGROUND OF THE INVENTION

Storm drains and inline drains collect storm water and other surface runoff from streets, parking lots, heavily traveled locations, etc. It has become increasingly desirable to have such water drainage undergo some initial cleaning prior to discharge into a receiving water, such as a stream, river, lake, coastal area, or wastewater treatment facility. Many proposals have been made to enhance storm drain effectiveness. Often this is done with the use of a filtration system. For example, U.S. Pat. No. 6,080,307 et al discloses a storm drain with a filter media. These filter media comprise bags with an open structure, and are designed to absorb oils, greases and other hydrocarbons, metals, nutrients, bacteria and sediments from the surface runoff. Gravity pulls the runoff down through the filter media.

With all known runoff treatment systems that use filter media, there has been a problem with buildup of sediment on top of the media when the storm water flows down through the filter media. This downward, gravity forced flow results in clogging of the filter media which leads to reduced flow rates and reduced surface area in the filter media for capturing pollutants. In the treatment of surface water runoff, it would be highly desirable to have a filtration system which did not have this problem.

SUMMARY OF THE INVENTION

In accordance with a first aspect, a surface water runoff filtration device comprises an intake which is adapted to receive storm water and other surface water runoff, and filter media. The storm water flows from the surface through the intake to below the filter media, and then upwards back towards the surface through the filter media. This device may be used for all surface drains including both catch basin storm drains and inline drains.

From the foregoing disclosure and the following more detailed description of various preferred embodiments it will be apparent to those skilled in the art that the present invention provides a significant advance in the technology of surface water runoff filtration devices for surface drains. Particularly significant in this regard is the potential the invention affords for providing a high quality, low cost, filtration treatment system that is environmentally friendly. Additional features and advantages of various preferred embodiments will be better understood in view of the detailed description provided below.

Figure 1:
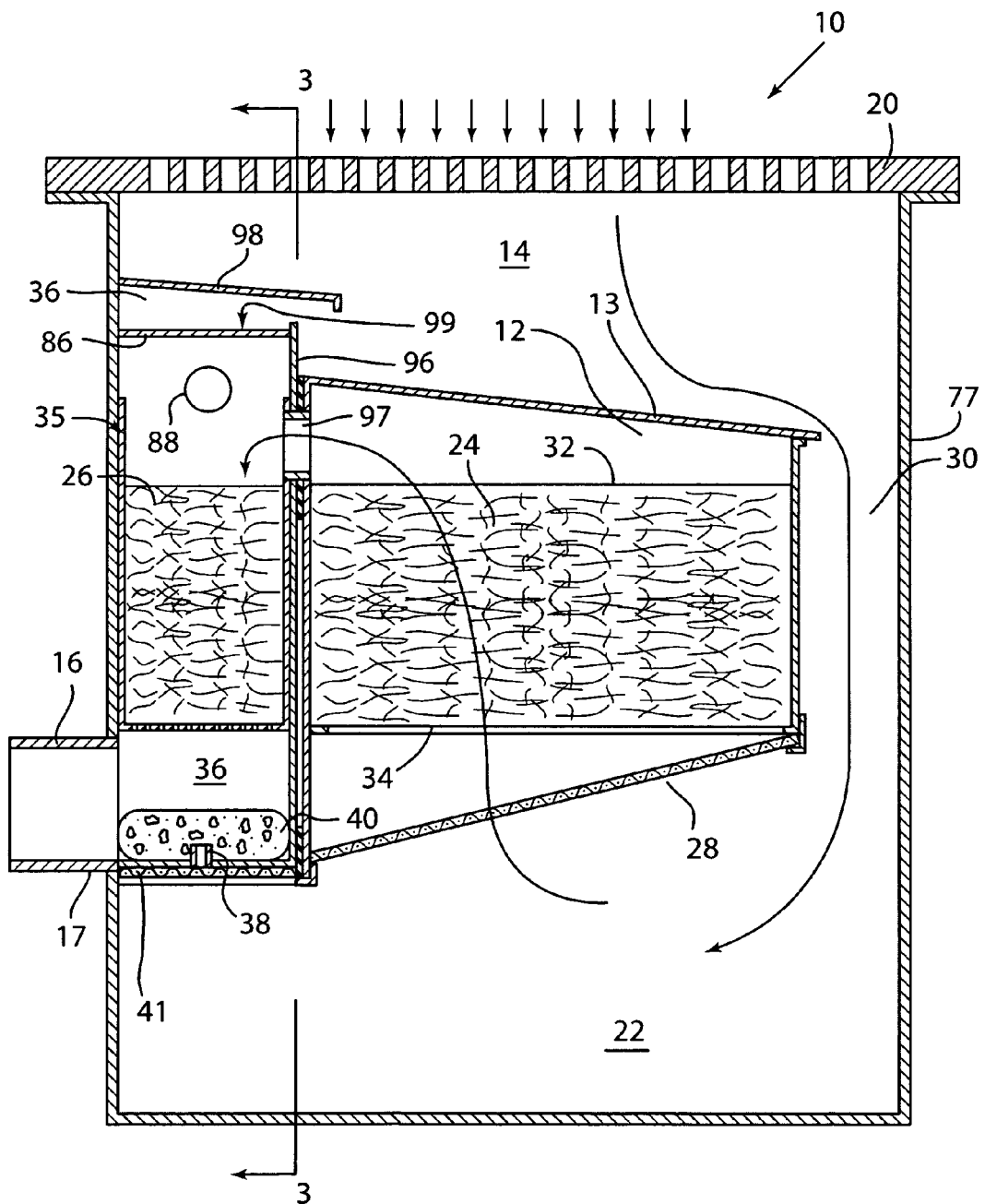
FIG. 1 is a schematic side view of a storm drain according to a preferred embodiment.

It should be understood that the appended drawings are not necessarily to scale, presenting a somewhat simplified representation of various preferred features illustrative of the basic principles of the invention. The specific design features of the filter as disclosed here, including, for example, the specific dimensions of the filter media, will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicated, refer to the orientation illustrated in the drawings. Top and up refers to the upward direction in the plane of the paper in FIG. 1, and bottom and down refer to the downward direction in the plane of the paper in FIG. 1

DETAILED DESCRIPTION OF CERTAIN PREFERRED EMBODIMENTS

It will be apparent to those skilled in the art, that is, to those who have knowledge or experience in this area of technology, that many uses and design variations are possible for the filter for a storm drain disclosed here. The following detailed discussion of various alternative and preferred features and embodiments will illustrate the general principles of the invention with reference to a storm drain suitable for use in drains found along streets or parking lots and other heavily traveled locations. Other embodiments suitable for other applications will be apparent to those skilled in the art given the benefit of this disclosure.

Figure 2:
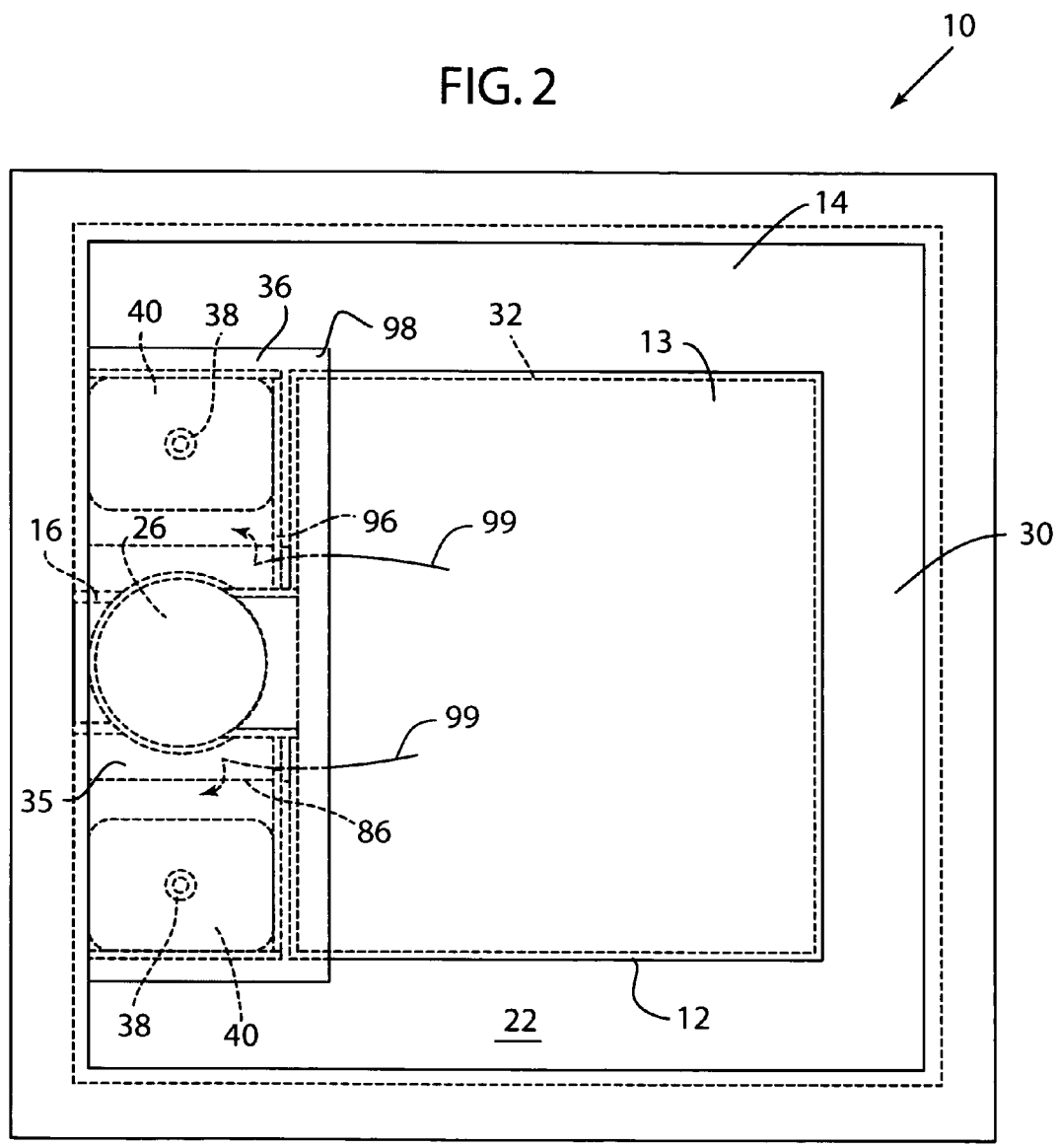
FIG. 2 is a top view of the storm drain of FIG. 1, showing the bypass flow path for storm water to either side of the secondary filter media during very heavy inflow of storm water.
Figure 3:
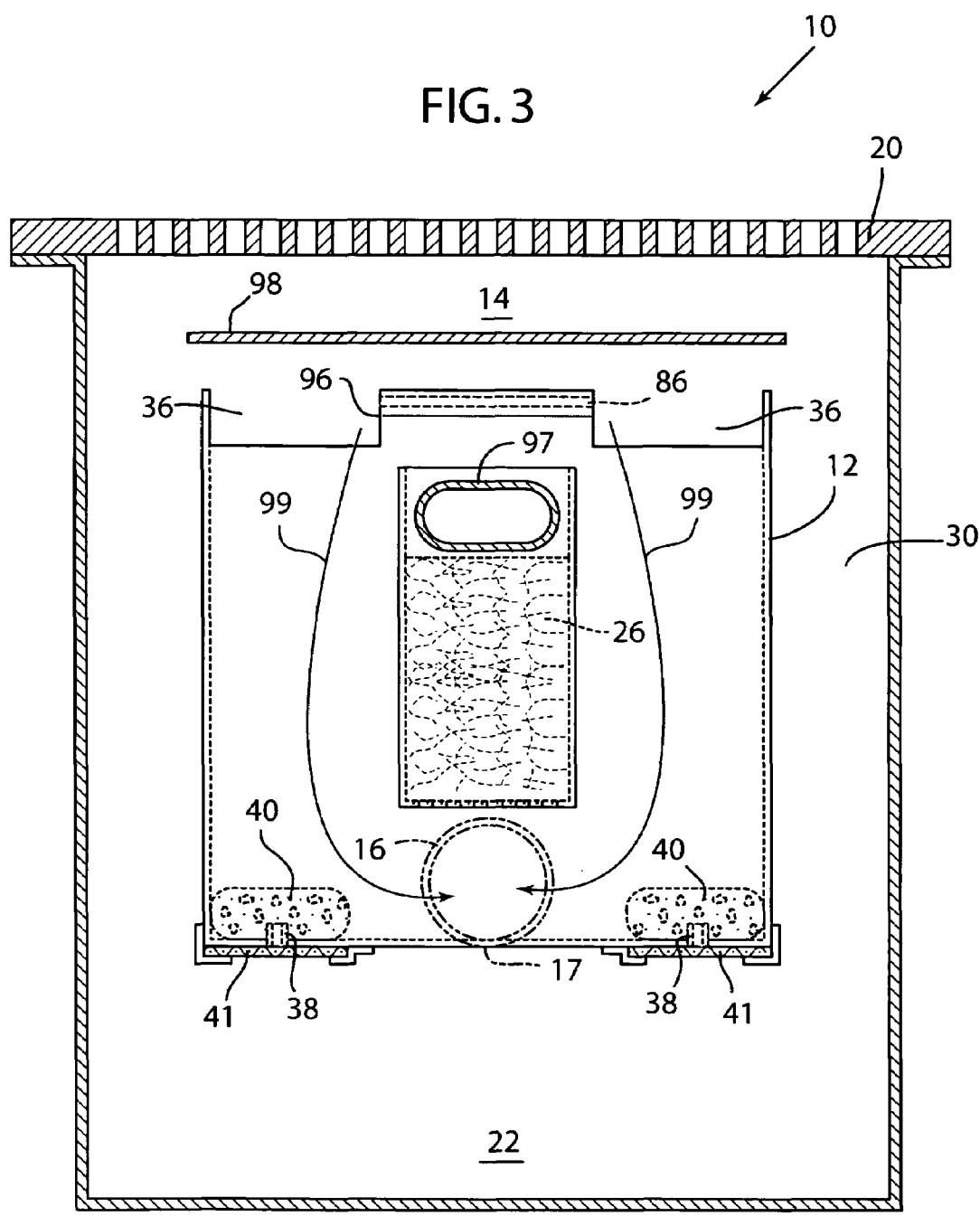
FIG. 3 is a cross section view of the drain, taken along line 3—3 of FIG. 1.

Referring now to the drawings, in FIG. 1 shows an upflow filtration system 10 for a catch basin 77 in accordance with a preferred embodiment. The top of the system 10 is typically positioned generally adjacent to a surface. Surface water runoff, which can comprise storm water or water from other sources at the surface, can contain a host of pollutants and other elements, including hydrocarbons, metals, bacteria, nutrients, sediments, etc. The surface water runoff passes through a grate or covering 20 into intake 14 and follows a travel path in response to the pull of gravity to the intake channel 30 and down to sump 22 around primary filter chamber 12. Primary media housing cover 13 is impermeable to the runoff, forcing the runoff to flow around its sides to intake channels 30. Heavier particulates and large debris will accumulate in the sump. In accordance with a highly advantageous feature, the pressure of the fluid behind the advancing runoff forces the runoff upwards, back toward the surface and into the primary filter chamber 12 through the primary filter media 24. Optionally, an upflow debris screen 28 may be positioned below a bottom 34 of the primary filter media 24 to block same of the particulate matter not previously trapped in the sump. After passing through the top 32 of the primary filter media 24, runoff can then drain into an outlet pipe 16 or, as shown in FIGS. 1–3, through connector tube 97 to a secondary chamber 35. Storm water and surface runoff can then flow downward through a second filter media 26, and from there to the outlet pipe 16. The primary filter media 24 can comprise one of several materials known to those skilled in the art for removal of the kinds of particulate matter commonly encountered in surface water runoff, such as sand or other coarse materials mixed with peat granules, gravel, zeolite, or similar materials which capture impurities in the runoff. The secondary filter media 26 can comprise specialized media for removal of specific pollutants such as bone char, activated carbon, iron infused sand or industrial resins. Other materials suitable for use as the primary filter media and/or the secondary filter media will be readily apparent to those skilled in the art given the benefit of this disclosure.

A diverter shield 98 is preferably used to prevent runoff from flowing directly from the intake 14 to the secondary chamber 35. FIG. 2 is a view looking down on the upflow filtration system of FIG. 1, and FIG. 3 is a cross section view facing the outlet pipe taken along line 3—3 in FIG. 1. Primary filter media 24 may be positioned surrounded on three sides by the intake channel 30 and underneath the diverter shield 98. Other geometries and configurations for the filter media will be readily apparent to those skilled in the art given the benefit of this disclosure.

A bypass is also shown to accommodate heavy flows. Bypass 36 can be formed as part of the secondary chamber 35 as a channel positioned adjacent to the secondary filter media 26. The bypass is designed to receive excessive flows of surface water runoff 99 to prevent flooding and ponding on the surface above the drain. That is, when the surface water runoff flow is greater than the capacity of the filter media to drain the surface water, the runoff will start to back up. This continues until the runoff 99 climbs over a weir or barrier 96. From there the runoff can flow either directly from the inlet 14 through bypass 36, around both the primary filter media and the secondary filter media to the outlet pipe 16, or the runoff 99 may contact a top housing 86 of the secondary filter media 26 and from there flow to either side of the secondary filter media and out through outlet pipe 16 as shown by flow arrows 99 seen in FIG. 3. Optionally, a secondary bypass port 88 may be positioned above connector tube 97 and below top housing 86, allowing secondary bypass flow directly to the bypass 36 if and when the runoff flowing through the primary media is backed up at the secondary media.

Optionally a weep tube 38 may be provided to directly connect the sump 22 to the outlet pipe 16. The weep tube would preferably drain slowly to allow accumulated water to escape from the volume below the top of the weir or barrier 96 of the filter media and above the bottom 17 of the outlet drain or pipe 16. A weep path debris screen 41 may be positioned between the sump and the weep tube 38, and weep filter media 40 may be positioned between the weep tube 38 and the bottom 17 of the outlet 16. Such weep tube filter media can comprise a mixture of sand and gravel, for example. One or more weep tubes may be used, as in FIGS. 2 and 3, where a pair of weep tubes are shown, one on either side of the secondary filter media.

Figure 4:
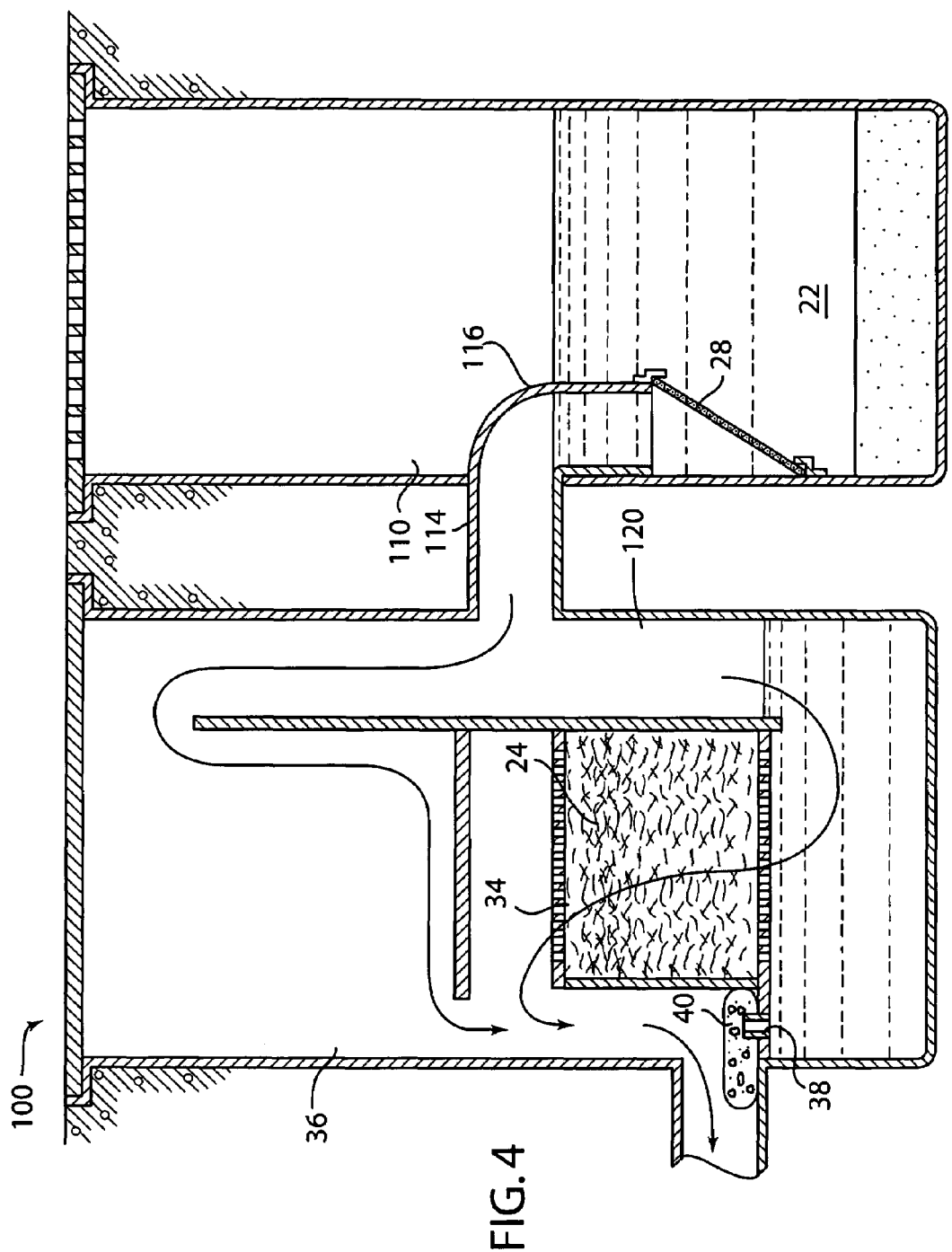
FIG. 4 is a schematic side view of an inline drain according to an alternate preferred embodiment.

FIG. 4 shows an inline drain in accordance with an alternate embodiment of the present invention, where the sump 22 and debris screen 28 are positioned in a first section 110. The first section 110 is connected to a second section 120 through hood 116 to connecting channel 114, and surface water runoff does not enter the second section until it rises above the level of the bottom of the connecting channel. Once the surface water runoff clears the connecting channel 114, it then flows down and then back up through filter media 24. Such inline drains may also be provided with a bypass channel and a weep tube, as well as access manholes for service.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A surface water runoff filtration device comprising, in combination:
   an intake which is adapted to receive surface water runoff from a surface;
   a sump positioned below the intake adapted to receive surface water runoff from the intake;
   an outlet;
   primary filter media; and
   a weep tube directly connecting the sump to the outlet, wherein surface water runoff which accumulates below the primary filter media and above the bottom of the outlet drains into the outlet through the weep tube;
   wherein the surface water runoff flows through the intake to below the primary filter media, and then up toward the surface through the primary filter media.

2. The surface water runoff filtration device of claim 1 wherein the sump is positioned below the primary filter media.

3. The surface water runoff filtration device of claim 2 further comprising an inlet screen on the bottom of the primary filter media, wherein the surface water runoff passes through the inlet screen prior to entering the primary filter media.

4. The surface water runoff filtration device of claim 1 comprising an upflow filter media chamber, wherein the primary filter media is positioned in the upflow filter media chamber.

5. The surface water runoff filtration device of claim 4, wherein the filter media chamber has a top impermeable to surface water runoff.

6. The surface water runoff filtration device of claim 4 wherein the intake is connected to a sump positioned below the primary filter media by an intake path around the filter media chamber.

7. The surface water runoff filtration device of claim 1 wherein the primary filter media comprises at least one of sand, gravel, and peat granules.

8. The surface water runoff filtration device of claim 1 further comprising secondary filter media, and the primary filter media is positioned to receive the surface water runoff first, and the secondary filter media is positioned to receive the surface water runoff after the surface water runoff has passed through the primary filter media.

9. The surface water runoff filtration device of claim 8 wherein the secondary filter media comprises at least one of activated carbon, iron infused sand and industrial resins.

10. The surface water runoff filtration device of claim 8 further comprising a bypass, wherein the surface water runoff flows directly from the inlet to an outlet pipe, bypassing the filter media.

11. The surface water runoff filtration device of claim 10 further comprising a barrier preventing access to the bypass unless the surface water runoff passes through the intake in an amount greater than the capacity of the filter media to drain the surface water runoff.

12. A surface water runoff filtration device comprising, in combination:
   an intake which is adapted to receive surface water runoff;
   a sump positioned below the intake adapted to receive surface water runoff;
   primary filter media having a top and a bottom;
   an outlet positioned below the primary filter media;
   wherein the primary filter media is adapted to receive the surface water runoff from the sump through the bottom of the primary filter media; and
   a bypass which connects the intake to the outlet and allows the surface water runoff to bypass the primary filter media.

13. The surface water runoff filtration device of claim 12 further comprising a secondary chamber containing a secondary filter media, wherein the secondary chamber is adapted to receive surface water runoff from the primary filter media.

14. The surface water runoff filtration device of claim 13 wherein the bypass allows runoff to flow around the secondary chamber and bypass the secondary filter media.

15. The surface water runoff filtration device of claim 14 further comprising a primary filter media chamber containing the primary filter media, and a secondary bypass port allowing runoff to flow from the primary media to the bypass without passing through the secondary filter media.

16. The surface water runoff filtration device of claim 12 further comprising a weep tube directly connecting the sump to the outlet;
   wherein surface water runoff which accumulates below a top of a barrier and above a bottom of the outlet drains into the outlet through the weep tube.

17. The surface water runoff filtration device of claim 16 further comprising a weep path debris screen positioned between the sump and the weep tube, and weep filter media positioned between the outlet and the weep tube.

18. The surface water runoff filtration device of claim 12 further comprising a first section and a second section remote from the first section, wherein the sump is positioned in the first section and the primary filter media is positioned in the second section.

19. The surface water runoff filtration device of claim 18 further comprising a connector tube positioned above the top of the primary filter media, wherein surface water runoff flows from the primary filter media through the connector tube to the outlet pipe.

20. The surface water runoff filtration device of claim 12 further comprising a primary media housing cover positioned above the top of the filter media, wherein the surface water runoff avoids the top of the filter media and is guided toward an intake channel.

21. A surface water runoff filtration device in a catch basin comprising, in combination:
   an intake channel which is adapted to receive surface water runoff;
   a sump having a bottom, and positioned below the intake, wherein the surface water runoff can be received by the sump;
   primary filter media having a top and a bottom, wherein the primary filter media can receive surface water runoff from the sump through the bottom of the primary filter media;
   an outlet from the catch basin which receives runoff after passing through the top of the primary filter media;
   wherein a portion of the intake channel is above the top of the primary filter media, the outlet is operatively connected to the catch basin below the bottom of the primary filter media, and the bottom of the sump is below the outlet.

* * * * *

UNITED STATES PATENT AND TRADEMARK OFFICE
CERTIFICATE OF CORRECTION

| | |
|---|---|
| PATENT NO. | : 7,005,060 B2 |
| APPLICATION NO. | : 10/458416 |
| DATED | : February 28, 2006 |
| INVENTOR(S) | : Robert E. Pitt, David A. Woelkers and Jeffrey K. Suhr |

It is certified that error appears in the above-identified patent and that said Letters Patent is hereby corrected as shown below:

On title page, item 73 should read: Hydro International plc

Signed and Sealed this

Twenty-sixth Day of June, 2007

JON W. DUDAS
*Director of the United States Patent and Trademark Office*